United States Patent [19]

Boelkins

[11] 4,230,345
[45] Oct. 28, 1980

[54] COUPLING FOR VACUUM SYSTEMS

[75] Inventor: Wallace G. Boelkins, Grand Rapids, Mich.

[73] Assignee: Uni-Mist, Inc., Grand Rapids, Mich.

[21] Appl. No.: 966,788

[22] Filed: Dec. 6, 1978

[51] Int. Cl.² .............................................. A47I 9/24
[52] U.S. Cl. ......................................... 285/7; 285/24; 285/38; 285/317; 285/320; 285/DIG. 2; 339/44 R
[58] Field of Search ............... 285/7, 317, 319, 320, 285/38, DIG. 2, 24, 27; 251/299, 303; 15/313; 339/44 R, 75 R, 75 M

[56] References Cited

U.S. PATENT DOCUMENTS

| | | | |
|---|---|---|---|
| 1,384,491 | 7/1921 | Simmon | 339/44 R X |
| 1,432,583 | 10/1922 | Williams | 285/320 |
| 2,636,518 | 4/1953 | Strebel | 251/114 |
| 2,771,308 | 11/1956 | Vitcha et al. | 285/317 X |
| 3,480,252 | 11/1969 | Simons | 251/299 X |
| 3,482,205 | 12/1969 | Senior | 339/44 R X |
| 3,682,500 | 8/1972 | Hamrick | 285/7 |
| 3,943,325 | 3/1976 | Pickard | 339/44 R |

Primary Examiner—Dave W. Arola
Attorney, Agent, or Firm—Price, Heneveld, Huizenga & Cooper

[57] ABSTRACT

A coupling for a vacuum system includes a socket member and a plug member. The socket member has a body defining a through bore opening at a front face. A cover supporting a gasket is pivotally carried on the socket member and adapted to cover and seal the through bore opening. The plug member includes a body defining a tubular nipple dimensioned to be received within the socket member through bore. A seal is carried by the plug member and positioned to engage the front face of the socket member when the nipple is inserted into the socket member. A lock pin is carried by the cover and dimensioned to fit within a recess defined by the plug member body.

19 Claims, 15 Drawing Figures

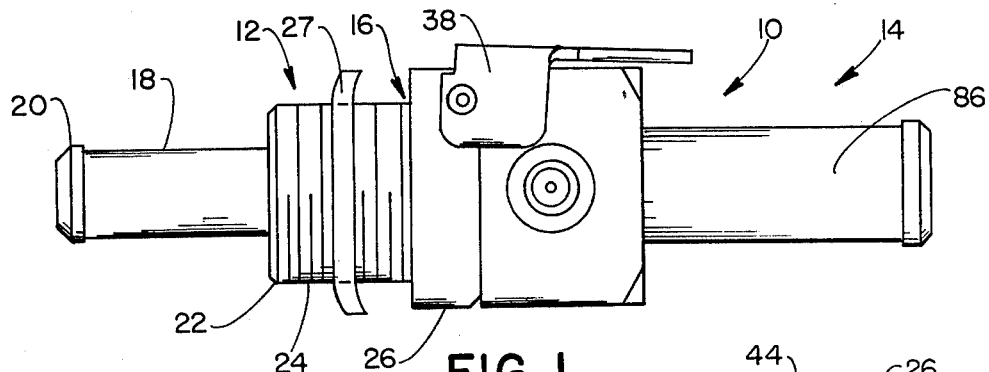
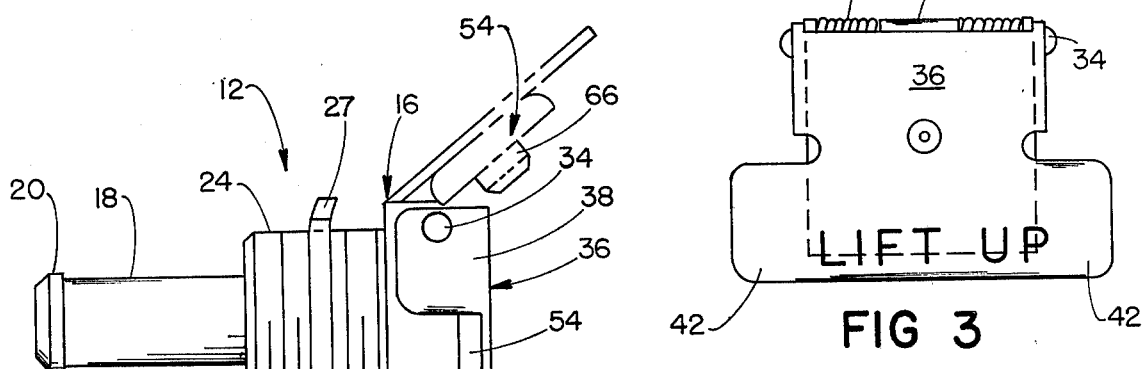
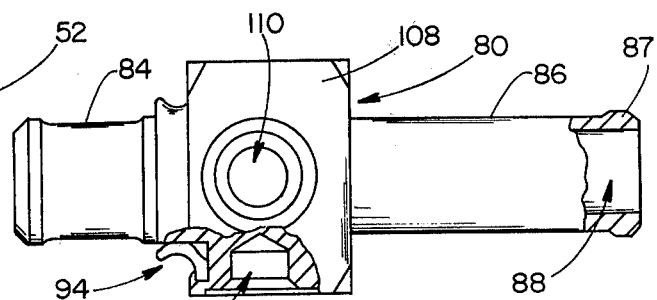
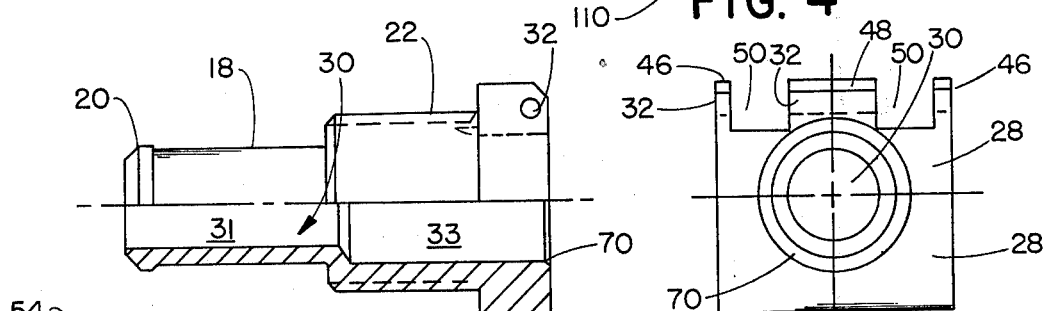
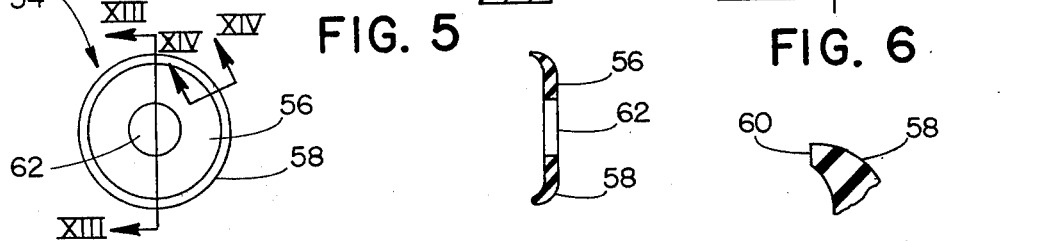

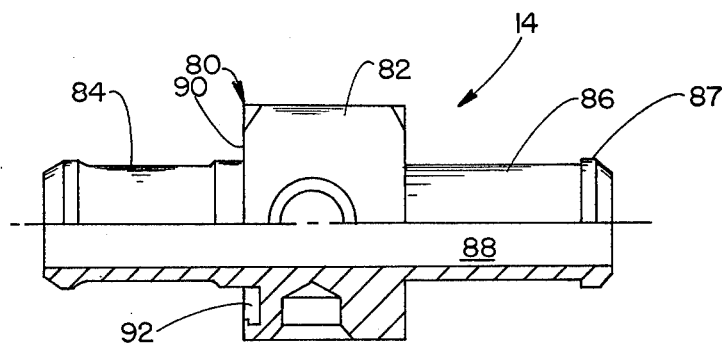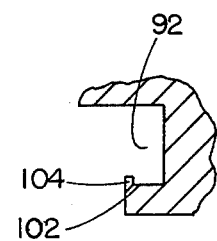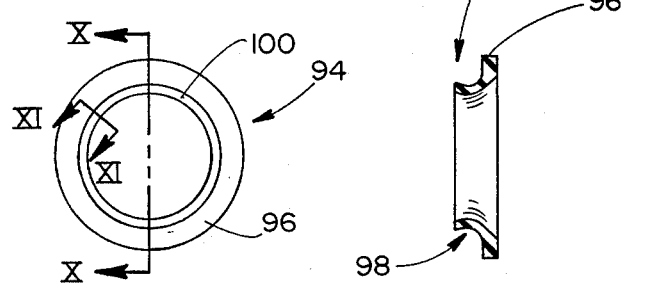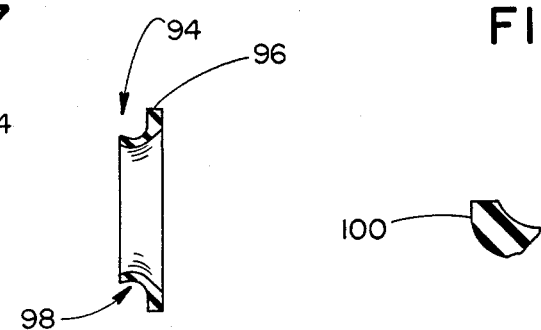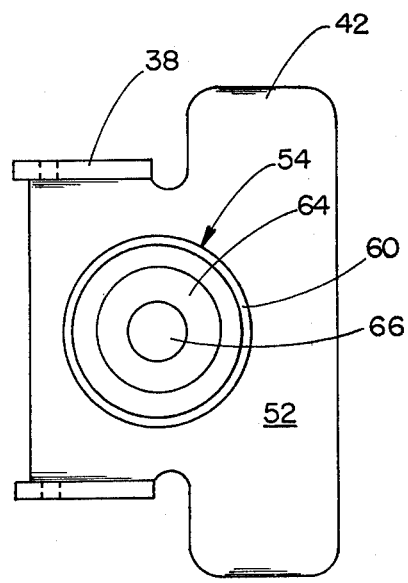

COUPLING FOR VACUUM SYSTEMS

BACKGROUND OF THE INVENTION

The present invention relates to fluid systems and more particularly to a coupling for a vacuum system.

In a wide variety of applications, a need exists for a quick disconnect-type coupling permitting the user to quickly connect into or disconnect from a source of vacuum. For example, in certain vacuum assist or power assist braking systems, a towed vehicle includes a braking system which is coupled to a vacuum source on the pulling vehicle. Provision is made for connecting the towed vehicle portion of the vacuum system to the pulling vehicle. Since the source of vacuum on the pulling vehicle is typically the intake manifold of an internal combustion engine, it is critical that the coupling not permit air to bleed into the pulling vehicle vacuum system. Leakage might affect the operation of the internal combustion engine.

Vacuum couplings are also used in industrial, dairy and laboratory fields. For example, a source of vacuum may be required at certain workbench areas, such as in electronic manufacture for removal of solder. It would be desirable to provide a central vacuum system including a plurality of outlets positioned at each of the work areas. A user need merely connect into the vacuum system when a source of vacuum is required. Also, in the dairy field, vacuum operated devices are employed. For example, milking machines are available which are vacuum operated. In such systems, it would be desirable to connect selectively the operative portion of the milker to a central source of vacuum at various locations within the milking room or barn.

Heretofore various problems have been experienced in providing a quick disconnect coupling which maintains an adequate seal to prevent leakage of air into the system when connected or disconnected. Also, problems have been experienced with ease of use, reliability in use and ease of manufacture.

SUMMARY OF THE INVENTION

In accordance with the present invention, a relatively easily manufactured, reliable and effective vacuum system coupling is provided. Essentially, the coupling includes a female member defining a through passage, a closure movably carried by the female member and movable from a first position away from the through passage to a second position covering the through passage, a seal carried by the closure for sealing the through passage when the closure is in the second position and a male member insertable into the through passage of the female member when the cover is in the first position. Provision is made for locking the male member to the female member when the coupling is effected.

BRIEF DESCRIPTION OF THE DRAWINGS

FIG. 1 is a side, elevational view of the vacuum system coupling including a socket and a plug in accordance with the present invention;

FIG. 2 is a side, elevational view of the socket of the present invention;

FIG. 3 is a front, elevational view of the socket;

FIG. 4 is a side, elevational view in partial section of the plug of the present invention;

FIG. 5 is a side, elevational view in partial section of the socket body;

FIG. 6 is a front, elevational view of the socket body;

FIG. 7 is a side, elevational view in partial section of the plug in accordance with the present invention;

FIG. 8 is an enlarged, sectional, elevational view of a portion of a seal retaining groove defined by the plug;

FIG. 9 is a front, elevational view of a seal or gasket carried by the plug;

FIG. 10 is a cross-sectional view taken along line X—X of FIG. 9;

FIG. 11 is a greatly enlarged, cross-sectional view of a portion of the seal of FIG. 9 taken generally along line XI—XI of FIG. 9.

FIG. 12 is a front, elevational view of a gasket or seal carried by the closure;

FIG. 13 is a sectional view taken generally along line XIII—XIII of FIG. 12;

FIG. 14 is an enlarged, cross-sectional view taken generally along line XIV—XIV of FIG. 12 showing a portion of the skirt of the seal of FIG 12; and FIG. 15 is an enlarged, rear elevational view of the closure.

DETAILED DESCRIPTION OF THE PREFERRED EMBODIMENT

The preferred embodiment of the vacuum system coupling in accordance with the present invention is illustrated in the drawings and generally designated 10. The coupling 10 includes a female member or socket 12 and a male member or plug 14. The coupling 10 is adapted to be inserted into a vacuum system in order to provide a quick connect and disconnect capability.

The female member or socket 12, as seen in FIGS. 1, 2 and 5, includes a body 16 defining a tubular connector portion 18 having a fluted end 20, a generally cylindrical, intermediate portion 22 which may include external threads 24 and a generally rectangular portion 26 which defines a front face 28. A lock nut 27 is threaded to portion 22. The lock nut may secure the socket 12 to a panel at a suitable aperture. As seen in FIG. 5, the body 16 defines a through passage or bore 30. The through passage or bore 30 includes a first, reduced diameter portion 31 through the connector or nipple portion 18 and a second, enlarged diameter portion 33 through substantially the entire length of the cylindrical portion 22 and the rectangular portion 26. The through passage or bore 30 opens through the face 28.

The rectangular portion 26 of the female member 12 includes a transversely extending passage 32. The passage or opening 32 is dimensioned to receive a pivot pin 34. The pivot pin 34 pivotally secures or movably mounts a cover 36 to the body 16. The cover 36 includes rearwardly extending pivot tabs 38 through which the pivot pin 34 extends. The cover, as best seen in FIG. 2, is movable from a first position shown in phantom above and away from the face 28 of the body 16 to a second position wherein the cover 36 is in juxtaposition with the front face 28 of the body 16. As seen in FIGS. 3 and 15, the cover 36 includes outwardly extending tabs 42. The tabs 42 provide a convenient point for grasping the cover and moving it between the first and second positions. Also, as best seen in FIG. 3, resilient means 44 are provided for biasing the cover 36 towards the second position illustrated in FIG. 2. In the form illustrated, the resilient means 44 comprises a coil spring carried on the pivot pin 34 and resiliently engaging the cover 36 adjacent the upper lateral edge thereof.

As best seen in FIG. 6, it is presently preferred that the rectangular portion 26 of the body include upstanding lugs 46 and 48. The lugs define the pivot pin passage 32 and also define spaces 50 within which the coil spring 44 may be positioned around the pivot pin 34.

The inner face 52 of cover 36 carries a seal or gasket 54 which is adapted to seal the through bore at the front face 28 of the female body when the cover 36 is in the second position. As seen in FIGS. 12, 13 and 14, the gasket 54 is generally cup-like or concave in shape. The gasket includes a base portion 56 and a peripheral skirt portion 58. The gasket opens toward the front face 28 of the body 16 when positioned on the cover 36. As seen in FIG. 14, the peripheral surface 60 of the gasket, which faces the body 16, is flat and the skirt portion 58 is tapered having an increasing cross-sectional thickness from the surface 60 to the base portion 56. The gasket 54 also defines a central aperture 62. As seen in FIG. 15, it is preferred that the gasket 54 be secured to the surface 52 of the cover by a suitable metal retainer 64 of a generally circular shape and pin 66 which sandwiches the base portion 58 of the gasket between the retainer 64 and the inner face 52 of the cover.

As seen in FIG. 6, the bore 30 at the face 28 includes a peripheral chamfer 70 around its periphery where it opens at the face 28. The chamfered or beveled portion 70 defines a seat for the face portion 60 of the seal 54 when the cover is in its second position.

When the socket 12 is connected to a suitable source of vacuum and the cover is positioned, as shown in FIG. 2, the coil spring or resilient means 44 biases the cover and hence the seal into engagement with the face 28 of the body at the chamfered portion 70. The gasket is also biased into engagement with the face of the body due to the vacuum acting on the base 56 of the gasket. This dual action insures an effective and complete seal at the face of the socket when the socket is disconnected from the male member or plug 14.

The male member or plug 14, as best seen in FIGS. 4 and 7, includes a body 80 defining a central, rectangular portion 82 and a pair of outwardly extending nipples or connectors 84, 86. Connector 86 includes a flute or barb 87 for connection to a flexible hose line, for example. The body 80 also defines a constant diameter through bore 88. Connector 84 is dimensioned to be received within an enlarged portion 33 of bore 30 of the female member 12. The rectangular portion 82 defines a generally planar face 90 which engages or abuts against the face 28 of the female member when the coupling portion or connector portion 84 is inserted into the bore 30. The face 90 also defines a seal retainer groove 92 which is annular or circular in shape and extends around the periphery of the connector portion 84.

A gasket or seal 94 (FIGS. 4, 9, 10 and 11) is held within the retainer groove 92. As seen in FIG. 10, the gasket 94 includes a circular, generally planar base or flange portion 96. Extending outwardly from the base or flange 96 is a generally tubular portion 98. The tubular portion 98 is of varying diameter and defines a generally annular peripheral groove. Tubular portion 96 terminates in a generally flat annular face 100. As seen in FIG. 8, the seal retainer groove 92 is undercut at 102 to define a retainer ledge or flange 104. The resilient seal 94 is disposed within the groove so that the base or flange portion 96 is held therein by the retainer ledge 104. When the connector portion 84 is pushed into the enlarged portion of through bore 30, the resilient seal 94 will be pressed into engagement with the face 28 around and at the seat 70. The tubular portion 98 of the seal will be deformed as the seal is pressed into contact with the face 28. The configuration of the seal 94 insures that an effective seal is maintained between the male and the female members to prevent leakage of air into the system at the coupling joint.

The generally rectangular body portion 92 of the male or plug member 14 includes, centrally of each of its faces 108, a chamfered, circular recess or blind bore 110. Each recess 110 is dimensioned to receive the pin 66 which also serves to secure the seal 54 to the cover 36. Pin 66 acts as a retainer or lock member. As seen in FIG. 1, when the male member 14 is inserted into the female member 12 and the retainer pin 66 is disposed within one of the recesses or blind bores 110, the male member is effectively locked to the female member. The coil spring or resilient biasing means 44 biases the cover into engagement with the male member and holds the retaining or locking pin 66 within the recess. Also, the pivot ears 38 of the cover engage the sides or faces 108 of the male member body which are adjacent to the side within which the lock pin is inserted. The cover and the lock pin therefore prevent rotational movement of the male member relative to the female member when they are coupled. The positioning of the retainer pin 66 on the cover and the location of the recesses 110 on the rectangular portion 82 of the male member 14 are such that gasket or seal member 94 is pressed into firm sealing engagement with the face 28 of the female member. As a result and due to the configuration of the seal 94, no leakage occurs at the joint defined by the coupling. Providing recesses 110 on each of the faces of portion 82 of male member 14 increases the ease of use of the coupling. An effective coupling may be maintained with the body in any one of four positions.

The female and male members are easily and relatively inexpensively manufactured employing conventional machining techniques. In a presently existing embodiment of the coupling in accordance with the present invention, the socket or female member body 16 is fabricated from brass, the gasket or seal 54 is formed from a Buna-N rubber material and the cover 36 is formed from cold rolled steel. The coil spring or resilient biasing mean 44 is fabricated from stainless steel spring wire. The lock pin and hinge pin are also fabricated from stainless steel. The plug or male member body 80 is preferably fabricated from a zinc plated stainless steel and the gasket or seal 94 is fabricated from a Buna-N rubber material. The seal 94 has an overall length of approximately 3/16 of an inch with the base portion 96 having a thickness of approximately 0.06 inches. The groove of the tubular portion has a radius of 1/32 of an inch and the generally flat, annular face 100 has a radial width of approximately 0.010 inches. the gasket 54 carried by the cover has an overall axial length of approximately 0.140–0.150 inches and the base portion 56 has an axial length or thickness of approximately 0.06 inches. The central aperture 62 has a diameter of approximately 0.205–0.215 inches. The overall diameter of the gasket is approximately 0.656 inches and the diameter of base 56 is 7/16 of an inch. The outer radius of the skirt portion is approximately ⅛ of an inch while the inner radius is approximately 3/32 of an inch. The flat circumferential face 60 has a radial thickness or width of between 0.010 and 0.015 inches. The sealing surface 70 of the female member is a 1/64 by 45° chamfer and the enlarged portion of the bore 30 has a diameter between 0.531 and 0.536 inches. The fluted portion 85 of the nipple 84 of male member 14 is chamfered at 3/64 by 30°. The outer diameter of the fluted portion is between 0.519 and 0.524 inches.

In view of the foregoing description, it should be readily apparent to one of ordinary skill in the art that the unique coupling in accordance with the present invention provides a covered socket, when connected to a vacuum source, and provides a ready outlet for a source of vacuum. The socket effectively prevents leakage of air into the system when the plug is disconnected. When a user desires to connect to the vacuum source, the cover need merely be moved to a position away from the face of the female member and the nipple portion 84 of male member 14 pushed into the enlarged portion of bore 30. The cover is then moved downwardly until retainer pin 66 is received within one of recesses 110. Pivot ears 38 also serve as guides to assist in alignment of the plug member with the socket member. The chamfers on the recess 110 provide a seat for seal 54 carried by the cover thereby preventing or reducing the chance of damage to the seal.

In view of the foregoing description, those of ordinary skill in the art will undoubtedly envision various modifications to the present invention which would not depart from the inventive concepts disclosed herein. For example, the retainer pin could be shifted to a different position of the cover and the recesses similarly relocated. Therefore, the above description should be considered as that of the preferred embodiment. The true spirit and scope of the present invention will be determined by reference to the appended claims.

The embodiments of the invention in which an exclusive property or privilege is claimed are defined as follows:

1. A vacuum system quick disconnect coupling, comprising:
    a socket member including a body, said body having a front face and defining a through bore having a seat opening at said front face;
    a cover having an outer and an inner face and depending ears;
    pivot means on said socket member for pivoting said cover to said socket member;
    a socket member seal dimensioned to seal said through bore at said front face;
    a retainer extending through said seal for securing said seal to the inner face of said cover;
    a plug member including a body defining a tubular nipple dimensioned to be received within said socket member through bore, said ears of said cover engaging and guiding said plug member during movement into said socket member through bore;
    plug member seal means carried by said plug member and surrounding said tubular nipple, said seal means engaging said socket member front face and surrounding said through bore when said nipple is disposed within said through bore, said plug member seal means comprising a one-piece resilient member having a generally tubular portion defining a peripheral groove and terminating in a flat face, said resilient member dimensioned to seal against said seat; and
    lock means on said cover for engaging and locking said plug member to said socket member when said nipple is disposed within said through bore.

2. A coupling as defined by claim 1 wherein said socket member further includes a fluted nipple extending from said body opposite said body face.

3. A coupling as defined by claim 1 wherein said socket member further includes biasing means engaging said cover for biasing said cover into engagement with said body front face.

4. A coupling as defined by claim 3 wherein said socket member seal comprises a circular resilient generally cup-shaped member opening towards said face, said cup-shaped member having a peripheral skirt, said skirt surrounding said through bore when said cover engages said face.

5. A coupling as defined by claim 4 wherein said lock means comprises said retainer being a retainer pin extending from said inner face of said cover and through said socket member seal.

6. A coupling as defined by claim 5 wherein said plug member body includes a recess dimensioned to receive said retainer pin to thereby lock said plug member to said socket.

7. A coupling as defined by claim 6 wherein said plug member body includes more than one of said recesses spaced peripherally around said body.

8. A vacuum system quick disconnect coupling, comprising:
    a socket member including a body, said body having a front face and defining a through bore opening at said front face;
    a cover having an outer and an inner face;
    pivot means engaging said cover for pivoting said cover to said socket member;
    a socket member seal dimensioned to seal said through bore at said front face;
    means on said cover for securing said socket member seal to said cover;
    a plug member including a body defining a tubular nipple dimensioned to be received within said socket member through bore;
    plug member seal means carried by said plug member and surrounding said tubular nipple, said seal means engaging said socket member front face and surrounding said through bore when said nipple is disposed within said through bore; and
    lock means on said cover for engaging and locking said plug member to said socket member when said nipple is disposed within said through bore, said socket member further including biasing means engaging said cover for biasing said cover into engagement with said body front face, said socket member seal comprising a circular, resilient, generally cup-shaped member opening towards said face, said cup-shaped member having a peripheral skirt, said skirt surrounding said through bore when said cover engages said face, said lock means comprising a retainer pin extending from said inner face of said cover, said plug member body including a recess dimensioned to receive said retainer pin to thereby lock said plug member to said socket, and wherein said plug member body includes more than one of said recesses spaced peripherally around said body and wherein said retainer pin extends from said cover concentrically with said socket member seal.

9. A coupling as defined by claim 8 wherein said plug member body defines a seal groove extending around said tubular nipple and said plug member seal means comprises a one-piece, resilient member disposed within said groove, said resilient member including a generally tubular portion extending from said seal groove and having a flat annular surface.

10. A coupling as defined by claim 9 wherein said biasing means comprises a coil spring.

11. A coupling as defined by claim 10 wherein said cover includes a tab extending from the side thereof, said tab engaging said plug member body to prevent rotation of said plug member body relative to said socket member.

12. A coupling as defined by claim 10 wherein said socket body further includes an externally threaded portion to permit said body to be mounted on a thread mount.

13. A fluid system coupling comprising:
- a female member including a body defining a through passage, said through passage defining a seal seat;
- a closure;
- mounting means movably mounting said closure onto said female member for movement between a first position away from said through passage and a second position covering said through passage;
- a seal carried by said closure for sealing said through passage at said seal seat when said closure is in said second position, said seal including a circular, resilient, generally cup-shaped member opening towards said through bore when said closure is in said second position, said cup-shaped member including a peripheral skirt and a flat face portion dimensioned to seat on said seal seat;
- means on the closure for securing said seal to said closure;
- a male member including a means defining a passage, said passage means being insertable into said through passage; and
- anti-rotation and lock means movable with said closure and engaging and guiding said male member when said passage means is inserted into said through passage for preventing rotation of said male member and locking said male member to said female member.

14. A fluid system coupling as defined by claim 13 further including another seal carried by one of said female member and said male member for sealing between said male member and said female member when said passage defining means is inserted in said through passage.

15. A fluid system coupling as defined by claim 14 wherein said anti-rotation and lock means comprises at least one tab extending from said cover and engaging said male member.

16. A fluid system coupling as defined by claim 15 wherein said anti-rotation and lock means further includes a lock pin extending from said cover and through said seal, said male member defining a recess within which said lock pin extends.

17. A fluid system as defined by claim 16 further including resilient means engaging said closure for biasing said closure to said second position.

18. An outlet for a vacuum system adapted to receive a plug member having a tubular nipple, comprising:
- a socket having a body defining a bore opening at a face of said body;
- passage means connected to said bore opening for defining a passage connectable to a vacuum source;
- a cover;
- mounting means movably mounting said cover to said body for movement between a first position away from the face of said body and a second position covering said bore opening;
- a resilient seal dimensioned to seal said bore opening when said cover is in said second position, said seal including a peripheral skirt, a base and a flat face portion; and
- a retainer pin extending from said cover and securing said seal to said cover, said retainer pin adapted to engage and retain a plug member body having a tubular nipple when the nipple extends into the passage.

19. An outlet as defined by claim 18 further including spring means on said socket body engaging said cover for biasing said cover into said second position and forcing said seal into sealing engagement with said socket body, said socket body including a chamfered surface around said bore opening, said chamfered surface defining a seat for said seal.

* * * * *